US012179479B2

(12) United States Patent
Yamaguchi

(10) Patent No.: US 12,179,479 B2
(45) Date of Patent: *Dec. 31, 2024

(54) MEDIUM CASSETTE

(71) Applicant: BROTHER KOGYO KABUSHIKI KAISHA, Nagoya (JP)

(72) Inventor: Masatomo Yamaguchi, Inazawa (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/351,522

(22) Filed: Jul. 13, 2023

(65) Prior Publication Data

US 2024/0010012 A1 Jan. 11, 2024

Related U.S. Application Data

(63) Continuation of application No. 17/209,347, filed on Mar. 23, 2021, now Pat. No. 11,738,577.

(30) Foreign Application Priority Data

Mar. 27, 2020 (JP) ................................ 2020-058449

(51) Int. Cl.
*B41J 15/04* (2006.01)

(52) U.S. Cl.
CPC .................................. *B41J 15/044* (2013.01)

(58) Field of Classification Search
CPC ......... B41J 15/044; B65H 2301/41374; B65H 2801/12; B65H 2511/20; B65H 16/08;
(Continued)

(56) References Cited

U.S. PATENT DOCUMENTS 5,072,306 A 12/1991 Matsumoto et al.
9,457,587 B2 10/2016 Howarth et al.
(Continued)

FOREIGN PATENT DOCUMENTS

JP H02-264559 A 10/1990
JP H05-333634 A 12/1993
(Continued)

OTHER PUBLICATIONS

Notice of Allowance dated Apr. 14, 2023 from parent U.S. Appl. No. 17/209,347.
(Continued)

*Primary Examiner* — Kristal Feggins
(74) *Attorney, Agent, or Firm* — Scully, Scott, Murphy & Presser, PC

(57) ABSTRACT

A roll medium is accommodated in a medium cassette. The roll medium has a configuration where a continuous medium is rolled in a roll shape. The roll medium rotates in a direction that the roll medium is unrolled as the continuous medium unrolled from the roll medium is conveyed in a conveying direction away from the roll medium. The medium case includes a supporter which rotatably supports the roll medium in contact with an outer peripheral surface of a lower part of the roll medium in at least one support position on each of both sides between which a lower end of the roll medium is sandwiched, and a passage through which the continuous medium unrolled from the roll medium passes. The passage is formed below at least the support position located on a most downstream side with respect to the conveying direction.

10 Claims, 7 Drawing Sheets

(58) Field of Classification Search
CPC .... B65H 16/023; B65H 16/028; B65H 29/20; B65H 35/06; B65H 23/26
See application file for complete search history.

(56) References Cited

U.S. PATENT DOCUMENTS

| | | | | |
|---|---|---|---|---|
| 11,738,577 | B2 * | 8/2023 | Yamaguchi | B41J 15/044 347/110 |
| 2006/0266863 | A1 | 11/2006 | Takasu | |
| 2017/0297350 | A1 | 10/2017 | Kurotobi et al. | |
| 2018/0029386 | A1 | 2/2018 | Matsumoto | |
| 2018/0257408 | A1 | 9/2018 | Eiyama et al. | |
| 2018/0281481 | A1 | 10/2018 | Yamaya | |
| 2020/0304649 | A1 | 9/2020 | Nakano et al. | |

FOREIGN PATENT DOCUMENTS

| | | | |
|---|---|---|---|
| JP | H07-017095 | A | 1/1995 |
| JP | H07-187495 | A | 7/1995 |
| JP | 2003-012167 | A | 1/2003 |
| JP | 2006-298608 | A | 11/2006 |
| JP | 2010-111467 | A | 5/2010 |
| JP | 2018-016034 | A | 2/2018 |
| JP | 2018-150106 | A | 9/2018 |
| KR | 10-2018-0103758 | A | 9/2018 |

OTHER PUBLICATIONS

Japanese Office Action dated Jan. 30, 2024 from related JP 2020-058449 together with English language translation.

* cited by examiner

MEDIUM CASSETTE

REFERENCE TO RELATED APPLICATIONS

This application is a continuation of U.S. patent application Ser. No. 17/209,347, filed Mar. 23, 2021, which claims priority from Japanese Patent Application No. 2020-058449 filed on Mar. 27, 2020. The contents of the aforementioned applications are incorporated herein by reference in their entirety.

BACKGROUND ART

Technical Field

The present disclosure relates to a medium cassette in which a roll medium is accommodated.

Background

JP-A-2003-012167 discloses a sheet feeding cassette (medium cassette) detachably mounted to a mounting opening of an image forming apparatus main body and configured to accommodate a roll sheet (roll medium) in a pivotally supported state.

According to a support configuration of the roll sheet in the sheet feeding cassette disclosed in JP-A-2003-012167, it may be troublesome to replace the roll sheet. For example, when attaching a shaft of a new roll sheet to the sheet feeding cassette, it may be necessary to adjust a position of the roll sheet so that the shaft of the roll sheet is appropriately supported by a bearing of the sheet feeding cassette.

Therefore, in order to facilitate a replacement operation of the roll medium (for example, the roll sheet), the present inventors studied a configuration of the medium cassette including a supporter configured to support the roll medium in contact with an outer peripheral surface of a lower part of the roll medium. In this configuration, the roll medium is supported in a plurality of support positions facing each other with a lower end of the roll medium being sandwiched therebetween in a direction intersecting with a rotation axis of the roll medium, a continuous medium is unrolled from the roll medium in a position higher than the plurality of support positions, and the continuous medium is pulled out curved in an opposite direction to a curl direction of the continuous medium. According to this configuration, when stiffness of the continuous medium is relatively high, an own weight of the roll medium becomes lighter as the roll medium is used, so that the roll medium may float and be separated from the supporter.

DESCRIPTION

Summary

The specification discloses a medium cassette that enables an easy replacement operation of a roll medium and enables to suppress the roll medium from floating from a supporter.

An aspect of the present disclosure is a medium cassette, in which a roll medium having a configuration where a continuous medium is rolled in a roll shape is accommodated, and the roll medium rotates in a direction that the roll medium is unrolled as the continuous medium unrolled from the roll medium is conveyed in a conveying direction away from the roll medium, the medium case including:

- a supporter configured to rotatably support the roll medium in contact with an outer peripheral surface of a lower part of the roll medium in at least one support position on each of both sides between which a lower end of the roll medium is sandwiched; and
- a passage through which the continuous medium unrolled from the roll medium passes,
- in which the passage is formed below at least the support position located on a most downstream side with respect to the conveying direction.

According to the medium cassette of the present disclosure, the supporter supports the roll medium in contact with the outer peripheral surface of the lower part of the roll medium. Therefore, it is not necessary to adjust a position of the roll medium, so that it is possible to facilitate a replacement operation of the roll medium. The passage is formed below at least the support position located on the most downstream side with respect to the conveying direction, and the continuous medium unrolled from the roll medium supported by the supporter passes through the passage, so that the continuous medium is difficult to be formed with a curved portion curved in an opposite direction to a curl direction. Therefore, even when stiffness of the continuous medium is relatively high, it is possible to suppress the roll medium from floating from the supporter as an own weight of the roll medium becomes lighter as the roll medium is used.

BRIEF DESCRIPTION OF DRAWINGS

FIGS. 3A and 3B show a schematic configuration of a transmission mechanism configured to transmit power to rollers configured to support a roll sheet and a drive mechanism, in which FIG. 3A depicts a power transmission situation when a feeder motor rotates in a forward direction, and FIG. 3B depicts a power transmission situation when the feeder motor rotates in a reverse direction.

DETAILED DESCRIPTION

Figure 1:
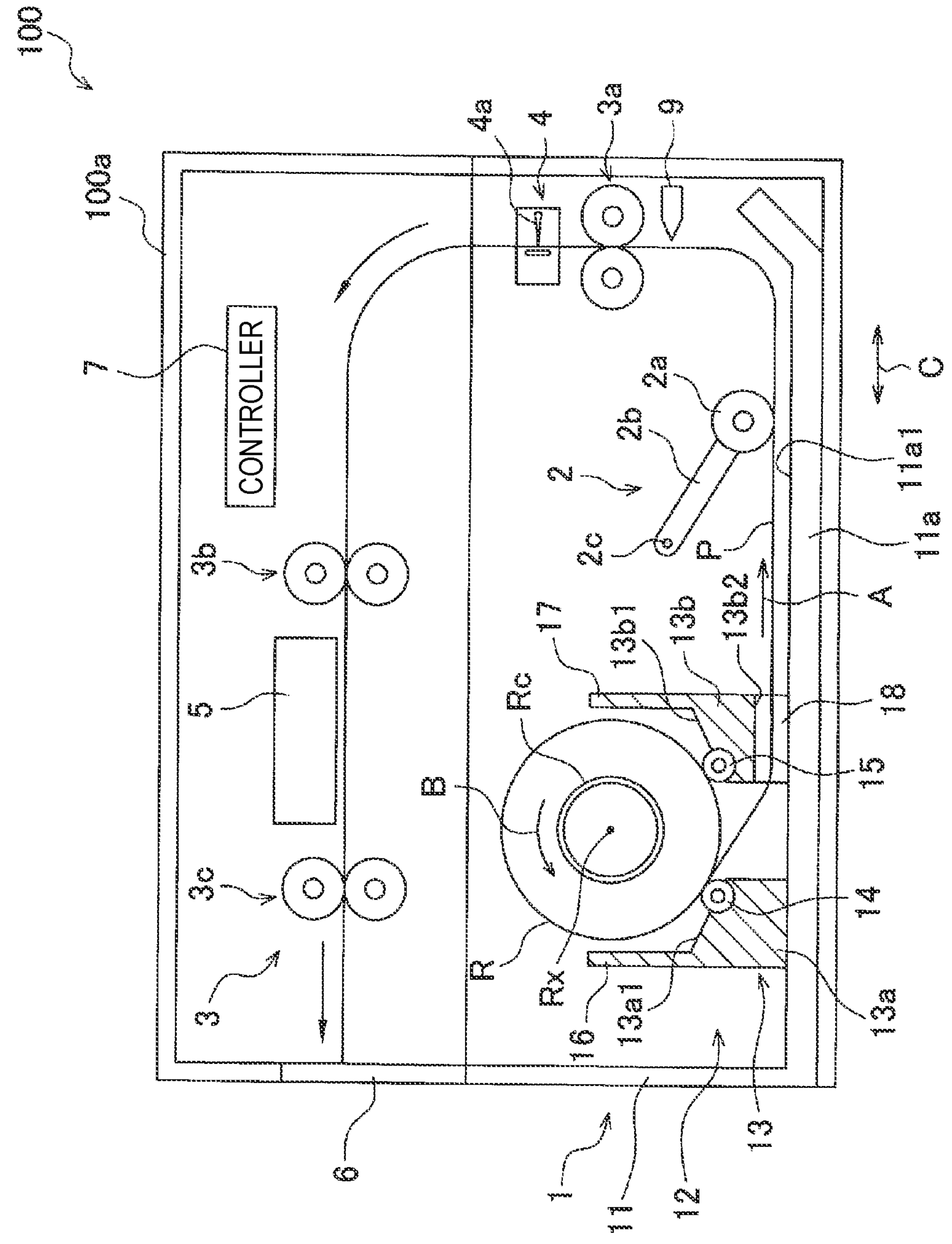
FIG. 1 is a schematic configuration view of a printer in which a sheet feeding cassette in accordance with an embodiment of the present disclosure is adopted.

A printer 100 in which a sheet feeding cassette 1 in accordance with an embodiment of the present disclosure is adopted will be described.

The printer 100 includes a housing **100*a*, a sheet feeding cassette 1, a sheet feeding unit 2, a conveyor unit 3, a cutting unit 4, a head 5, a sheet discharge tray 6, a controller 7, a drive mechanism 8 (refer to FIGS. 3A and 3B), and a sensor 9. The sheet feeding cassette (medium cassette) 1 can be detachably mounted to a lower part of the housing 100*a*. The sheet discharge tray 6 configures one side wall of an upper part of the housing 100*a*, and can be opened and closed with respect to the housing 100*a***.

In the sheet feeding cassette 1, a roll sheet R corresponding to the "roll medium" can be accommodated. The roll sheet R has a configuration where a sheet P corresponding to the "continuous medium" is rolled in a roll shape on an outer peripheral surface of a cylindrical core member (paper tube) Rc. The sheet P is paper or cloth. The roll sheet R is arranged so that an axis direction (a vertical direction of the drawing sheet of FIG. 1) along a rotation axis Rx (a central axis of the core member Rc) is orthogonal to a vertical direction. The axis direction of the rotation axis Rx is also a width direction of the sheet P. In the present embodiment, a conveying direction A in which the sheet P is unrolled from the roll sheet R and is conveyed away from the roll sheet R is a substantially the rightward direction, as shown in FIG. 1. A rotating direction of the roll sheet R while the sheet P is conveyed is an unrolling direction B of the roll sheet R.

Figure 3A:
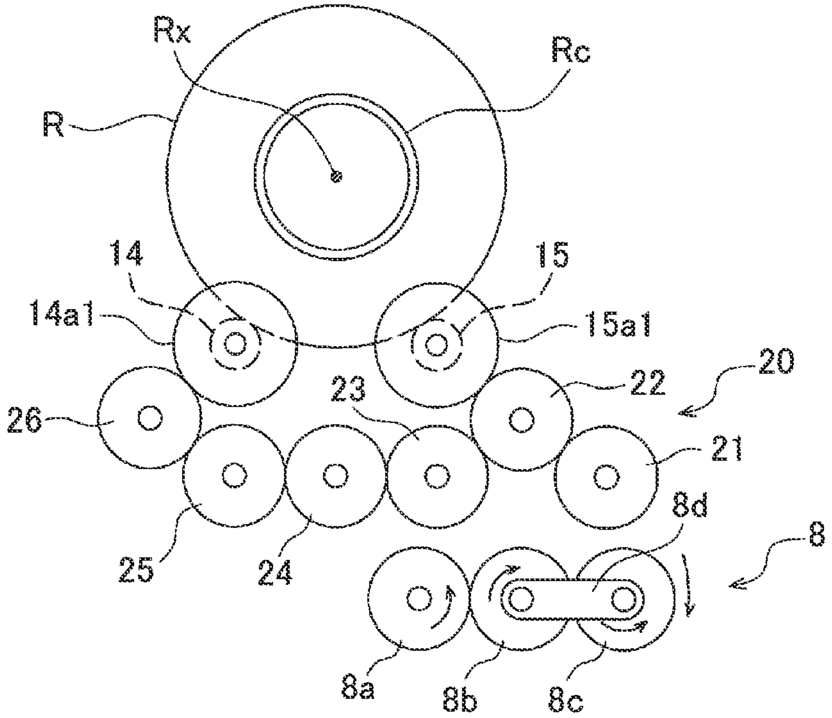
Figure 3B:
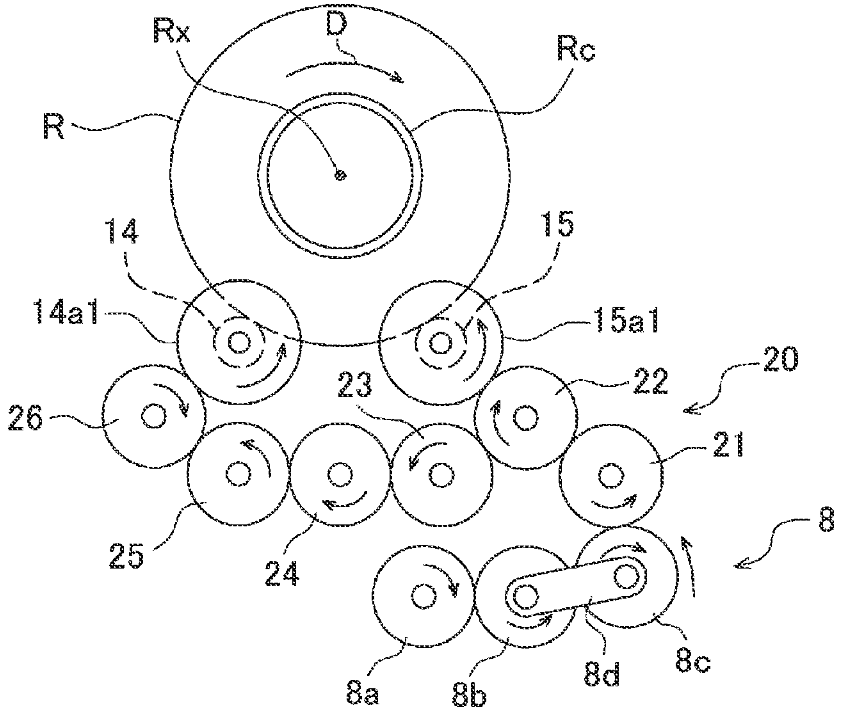

As shown in FIG. 1, the sheet feeding cassette 1 includes a tray 11, a supporter 12 which rotatably supports the roll sheet R in contact with an outer peripheral surface of a lower part of the roll sheet R, two restraint members 16 and 17, and a transmission mechanism 20 (refer to FIGS. 3A and 3B). The tray 11 has a box shape opened upward, and is configured so as to accommodate the roll sheet R. The supporter 12 includes a support base 13, and two rollers 14 and 15.

Figure 2:
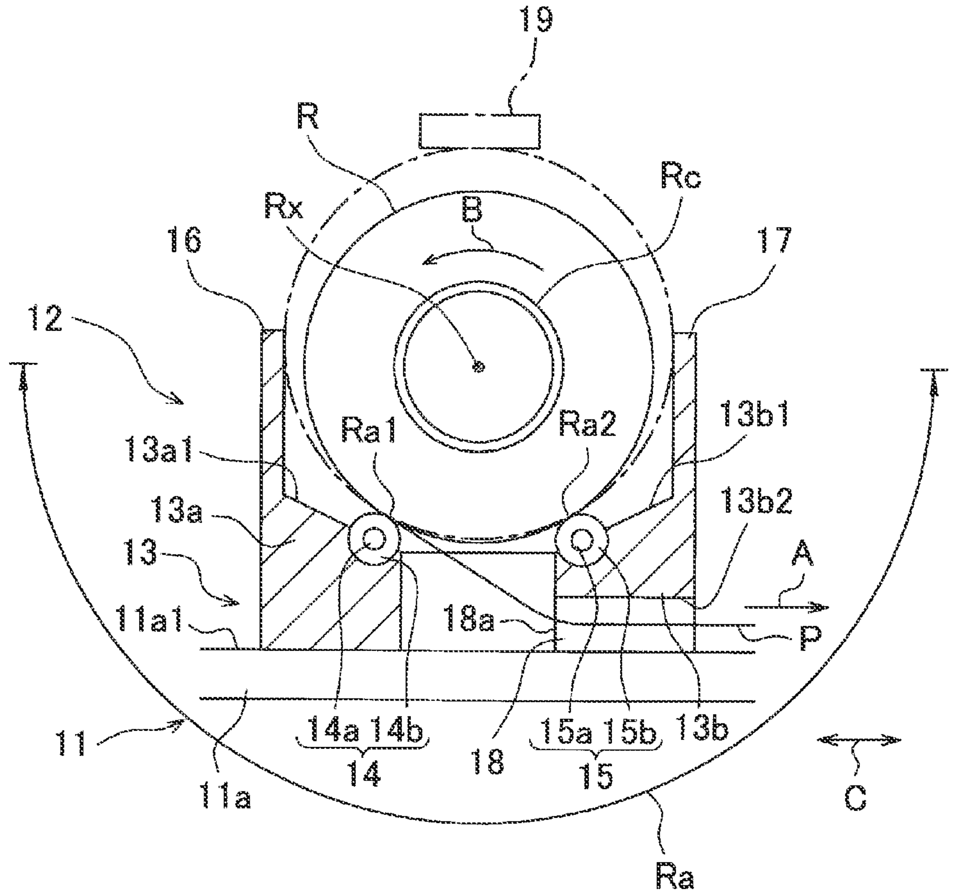
FIG. 2 is a partially enlarged view of the sheet feeding cassette.

As shown in FIG. 2, the support base 13 includes two base parts 13*a* and 13*b* apart from each other in a horizontal direction C orthogonal to the rotation axis Rx. The two base parts 13*a* and 13*b* are provided to be detachably mounted on a bottom part 11*a* of the tray 11. Each of the base parts 13*a* and 13*b* extends long in the axis direction of the rotation axis Rx. In the present embodiment, the base parts 13*a* and 13*b* are formed to be slightly longer than a width of the sheet P, i.e., the roll sheet R. The base part 13*a* is arranged on a further upstream side (the left side in FIG. 2) than the rotation axis Rx of the roll sheet R supported on the supporter 12 with respect to the conveying direction A. The base part 13*a* has an inclined surface 13*a*1 that is inclined downward toward the conveying direction A. The base part 13*b* is arranged on a further downstream side (the right side in FIG. 2) than the rotation axis Rx of the roll sheet R supported on the supporter 12 with respect to the conveying direction A. The base part 13*b* has an inclined surface 13*b*1 that is inclined upward toward the conveying direction A. In other words, the inclined surfaces 13*a*1 and 13*b*1 of the support base 13 are each inclined so that a height from a bottom surface 11*a*1 of the tray 11 increases in the horizontal direction C as a distance from the rotation axis Rx increases.

The two rollers (support roller) 14 and 15 also extend long in the axis direction of the rotation axis Rx, and are formed to be slightly longer than the width of the roll sheet R. The rollers 14 and 15 each have a shaft member 14*a*, 15*a*, and a cylindrical member 14*b*, 15*b* to which the shaft member 14*a*, 15*a* is inserted. An outer surface of each of the cylindrical members 14*b* and 15*b* is formed to have a friction coefficient greater than an outer surface of each of the shaft members 14*a* and 15*a*. Thereby, the friction coefficients of the outer surfaces of the cylindrical members 14*b* and 15*b* become relatively large, so that slip is difficult to occur between each of the rollers 14 and 15 and the roll sheet R. The rollers 14 and 15 may have a plurality of cylindrical members in which the shaft members 14*a* and 15*a* are inserted and which are arranged apart from each other in the axis direction of the rotation axis Rx.

The roller 14 is supported on the base part 13*a* so that the shaft member 14*a* can rotate around a rotation axis parallel to the rotation axis Rx. The roller 14 is also arranged below the inclined surface 13*a*1. The roller 15 is supported on the base part 13*b* so that the shaft member 15*a* can rotate around a rotation axis parallel to the rotation axis Rx. The roller 15 is arranged below the inclined surface 13*b*1. The two rollers 14 and 15 are configured to support the roll sheet R from below in contact with an outer peripheral surface of a lower part of the roll sheet R, in the present embodiment, a lower half circle area Ra of an outer peripheral surface of a lower part of the roll sheet R, as shown in FIG. 2. The two rollers 14 and 15 are also configured to support the roll sheet R in a state where the rollers are in contact with the outer peripheral surface of the roll sheet R (lower half circle area Ra) in two support positions Ra1 and Ra2 in the horizontal direction C between which the rollers sandwich a lower end of the roll sheet R. One support position Ra1 is a support position closest to the lower end on a further upstream side than the lower end of the roll sheet R with respect to the conveying direction A. The other support position Ra2 is a support position closest to the lower end on a further downstream side than the lower end of the roll sheet R with respect to the conveying direction A.

The base part 13*b* is also formed with a groove 13*b*2 that defines a passage 18 for enabling the sheet P to pass therethrough, between a lower surface of the base part 13*b* and the bottom surface 11*a*1 of the tray 11. The groove 13*b*2 is opened toward the bottom surface 11*a*1, extends horizontally in the conveying direction A, and has a width in the axis direction of the rotation axis Rx larger than the width of the roll sheet R. The groove 13*b*2 is also formed over the entire lower surface of the base part 13*b* in the conveying direction A. That is, the passage 18 is formed over the entire lower surface of the base part 13*b* in the conveying direction A and extends horizontally to pass below the support position Ra2. An entry 18*a* of the passage 18 for the sheet P is located between the two support positions Ra1 and Ra2 of the roll sheet R. The passage 18 is formed in this way, so that the sheet P unrolled from the roll sheet R can be enabled to pass from between the two rollers 14 and 15 (i.e., between the two support positions Ra1 and Ra2) to the passage 18 via the entry 18*a*. As shown in FIG. 1, the sheet P that passes through the passage 18 is arranged along the bottom surface 11*a*1 of the tray 11, and can be fed by a feeder roller 2*a*.

Gears 14*a*1 and 15*a*1 are fixed to one end portions of the shaft members 14*a* and 15*a* of the two rollers 14 and 15. Power of the drive mechanism 8 is transmitted to the gears 14*a*1 and 15*a*1 via the transmission mechanism 20.

As shown in FIG. 2, the restraint member 16 is erected upright on an upper end of an upstream end portion of the base part 13*a* with respect to the conveying direction A. The restraint member 17 is erected upright on an upper end of a downstream end portion of the base part 13*b* with respect to the conveying direction A. The two restraint members 16 and 17 are arranged so as to be close to the outer peripheral surface of the roll sheet R having a maximum size (a size of the roll sheet R shown with the solid line in FIG. 2) that can be supported by the supporter 12. Thereby, even when the rolling of the roll sheet R is loosened and an outer diameter of the roll sheet R intends to increase as shown with the dashed-dotted line in FIG. 2, the outer peripheral surface of the roll sheet R is contacted to the restraint members 16 and 17, so that the outer diameter is restrained from increasing.

As a modified embodiment of the restraint members 16 and 17, as shown with the dashed-dotted line in FIG. 2, a plate-shaped member may be provided above the roll sheet R, as a restraint member 19. In this case, the restraint member 19 may be provided on a ceiling part defining a space in which the tray 100 of the housing 100*a* is accommodated.

As shown in FIGS. 3A and 3B, the transmission mechanism 20 includes six gears 21 to 26, and is configured to transmit power from the drive mechanism 8 to the two rollers 14 and 15. The six gears 21 to 26 are arranged in mesh with each other in order, and are supported on the tray 11 so as to be rotatable around rotation axes parallel to the rotation axis Rx. The gear 26 is in mesh with the gear 14*a*1, and the gear 22 is in mesh with the gear 15*a*1.

The drive mechanism 8 (drive source) is provided to the housing 100*a*, and is configured to transmit power to the transmission mechanism 20. As shown in FIGS. 3A and 3B, the drive mechanism 8 has three gears 8*a* to 8*c*. The three gears 8*a* to 8*c* are in mesh with each other in order. When the feeder motor 2M (which will be described later) is driven, a rotating force thereof is transmitted to the gear 8*a*, so that the gear 8*a* is rotated. The two gears 8*a* and 8*b* are rotatably supported to the housing 100*a*. The two gears 8*b* and 8*c* are coupled by a coupling member 8*d*. The coupling member 8*d* has one end portion rotatably supported to a shaft part of the gear 8*b* and the other end portion rotatably supported to a shaft part of the gear 8*c*. Thereby, the gear 8*c* is supported to be swingable about the rotation axis of the gear 8*b* by the coupling member 8*d*.

In the configuration of the drive mechanism 8, when the feeder motor 2M is driven to rotate in a forward direction, as shown in FIG. 3A, the gear 8*a* rotates in a counterclockwise direction in FIG. 3A, the gear 8*b* rotates in a clockwise direction in FIG. 3A, and the gear 8*c* rotates in the counterclockwise direction in FIG. 3A. At this time, the coupling member 8*d* swings in the clockwise direction in FIG. 3A about the rotation axis of the gear 8*b*, and the gear 8*c* is spaced from the gear 21 of the transmission mechanism 20. That is, while the feeder motor 2M rotates in the forward direction, the drive mechanism 8 is in a state where the power thereof is not transmitted to the transmission mechanism 20. On the other hand, when the feeder motor 2M is driven to rotate in the reverse direction, as shown in FIG. 3B, the gear 8*a* rotates in the clockwise direction in FIG. 3B, the gear 8*b* rotates in the counterclockwise direction in FIG. 3B, and the gear 8*c* rotates in the clockwise direction in FIG. 3B. At this time, the coupling member 8*d* swings in the counterclockwise direction in FIG. 3B about the rotation axis of the gear 8*b*, and the gear 8*c* is in mesh with the gear 21 of the transmission mechanism 20. That is, while the feeder motor 2M rotates in the reverse direction, the drive mechanism 8 is in a state where the power thereof is transmitted to the transmission mechanism 20. When the power is transmitted from the drive mechanism 8 to the transmission mechanism 20, the six gears 21 to 26 rotate in arrow directions in FIG. 3B. Thereby, the two gears 14*a*1 and 15*a*1 are rotated, so that all the two rollers 14 and 15 are rotated in the counterclockwise direction in FIG. 3B. Thereby, the roll sheet R is rotated in a direction D in which the sheet P is rolled up, so that the sheet P is rolled up.

Figure 4:
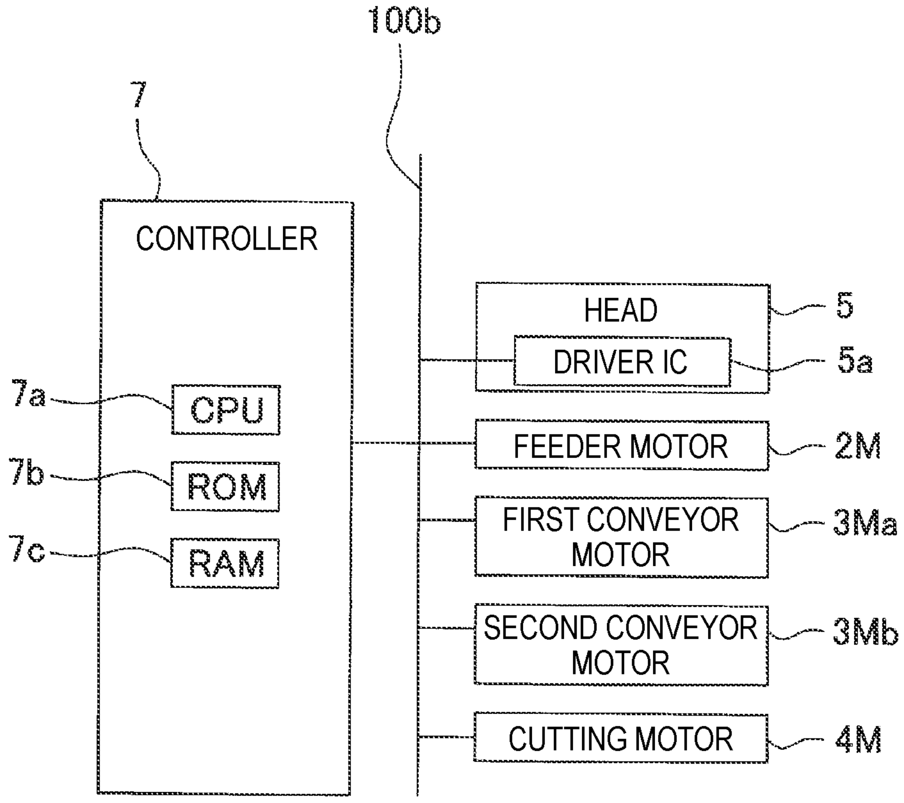
FIG. 4 is a block diagram including a controller.

As shown in FIG. 1, the sheet feeding unit 2 includes a feeder roller 2*a*, an arm 2*b*, a transmission mechanism (not shown), and the feeder motor 2M (refer to FIG. 4). The feeder roller 2*a* is pivotally supported to a tip end of the arm 2*b*. The arm 2*b* is rotatably supported to a support shaft 2*c*. When the feeder motor 2M is driven under control of the controller 7, the transmission mechanism transmits power of the feeder motor to the feeder roller 2*a*. That is, when the feeder motor 2M is driven to rotate in the forward direction, the feeder roller 2*a* is rotated so that the sheet P is fed in the conveying direction A. At this time, the transmission mechanism urges the arm 2*b* so that the feeder roller 2*a* comes close to the bottom surface 11*a*1 of the tray 11. Thereby, the sheet P is fed in the conveying direction A. When the feeder motor 2M is driven to rotate in the reverse direction, the transmission mechanism rotates the arm 2*b* so that the feeder roller 2*a* is spaced from the bottom surface 11*a*1. Thereby, the feeder roller 2*a* does not feed the sheet P toward the roll sheet R. The arm 2*b* is configured to retreat upward when attaching and detaching the tray 11.

The conveyor unit 3 includes three sets of conveying roller pairs 3*a* to 3*c*, a first conveyor motor 3Ma (refer to FIG. 4), and a second conveyor motor 3Mb (refer to FIG. 4). The conveying roller pair 3*a* is configured by a drive roller configured to rotate by drive of the first conveyor motor 3Ma and a driven roller configured to rotate in conjunction with the drive roller. The two sets of the conveying roller pairs 3*b* and 3*c* are each configured by a drive roller configured to rotate by drive of the second conveyor motor 3Mb and a driven roller configured to rotate in conjunction with the drive roller. The first and second conveyor motors 3Ma and 3Mb are driven under control of the controller 7 and each of the conveying roller pairs 3*a* to 3*c* rotates sandwiching the sheet P, so that the sheet P is conveyed.

The sensor 9 is provided to the housing 100*a*, and is arranged on a side upstream of the conveying roller pair 3*a* and downstream of the feeder roller 2*a* with respect to the conveying direction A of the sheet P. The sensor 9 is also configured to detect a tip end of the sheet P between the conveying roller pair 3*a* and the feeder roller 2*a* in the conveying direction A of the sheet P and to output a detection signal to the controller 7.

The cutting unit 4 is arranged above the conveying roller pair 3*a*. The cutting unit 4 includes a cutter 4*a*, and a cutting motor 4M (refer to FIG. 4) configured to drive the cutter 4*a*. The cutting motor 4M is driven under control of the controller 7, so that the sheet P unrolled and conveyed from the roll sheet R1 is cut by the cutter 4*a*. Thereby, a rear end of the sheet P is formed.

The head 5 includes a plurality of nozzles (not shown) formed in a lower surface, and a driver IC 5*a* (refer to FIG. 4). When the driver IC 5*a* is driven under control of the controller 7, ink is ejected from the nozzles, so that an image is recorded on the sheet P conveyed by the conveyor unit 3. The head 5 may be a line type configured to eject ink from nozzles in a position fixed state or a serial type configured to eject ink from nozzles while moving in the axis direction of the rotation axis Rx. The sheet P having an image recorded by the head 5 and cut by the cutter 4*a* is accommodated on the sheet discharge unit 6 opened with respect to the housing 100*a*.

As shown in FIG. 4, the controller 7 is connected to the feeder motor 2M, the first conveyor motor 3Ma, the second conveyor motor 3Mb, the driver IC 5*a*, the cutting motor 4M and the sensor 9 via an internal bus 100*c*.

The controller 7 includes a CPU (Central Processing Unit) 7*a*, a ROM (Read Only Memory) 7*b* and a RAM (Random Access Memory) 7*c*. In the ROM 7*b*, programs and data necessary for the CPU 7*a* to execute a variety of controls are stored. In the RAM 7*c*, data that is used when the CPU 7*a* executes the programs is temporarily stored.

Subsequently, operations of accommodating the roll sheet R into the sheet feeding cassette 1, and pulling out the sheet feeding cassette 1 from the housing 100*a* after recording an image on the sheet P of the roll sheet R are described with reference to FIGS. 5 and 6.

Figure 5A:
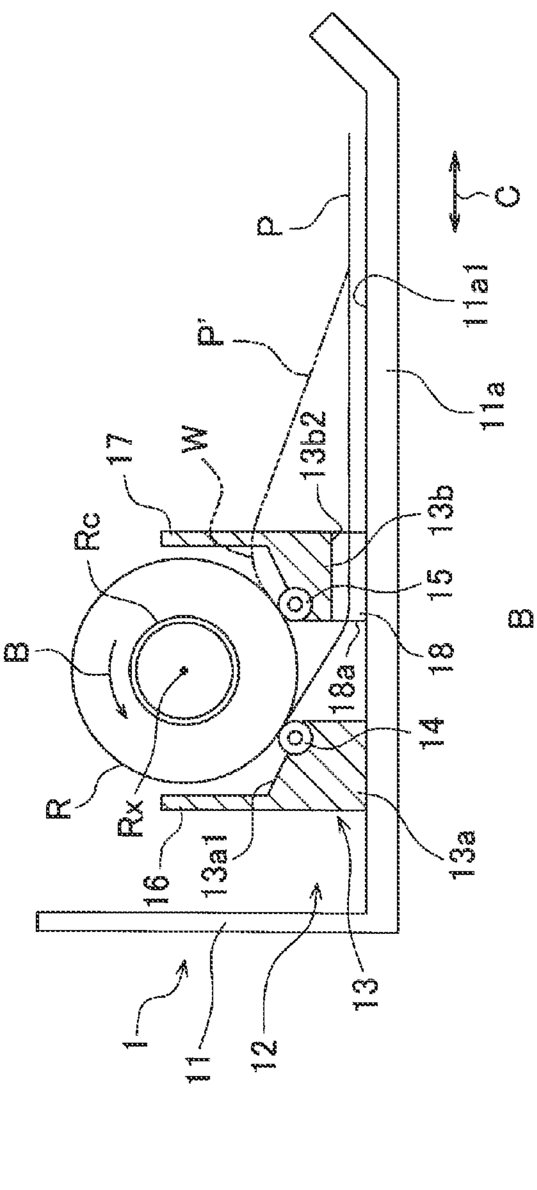
FIG. 5A depicts a situation when accommodating the roll sheet into the sheet feeding cassette.
Figure 5B:
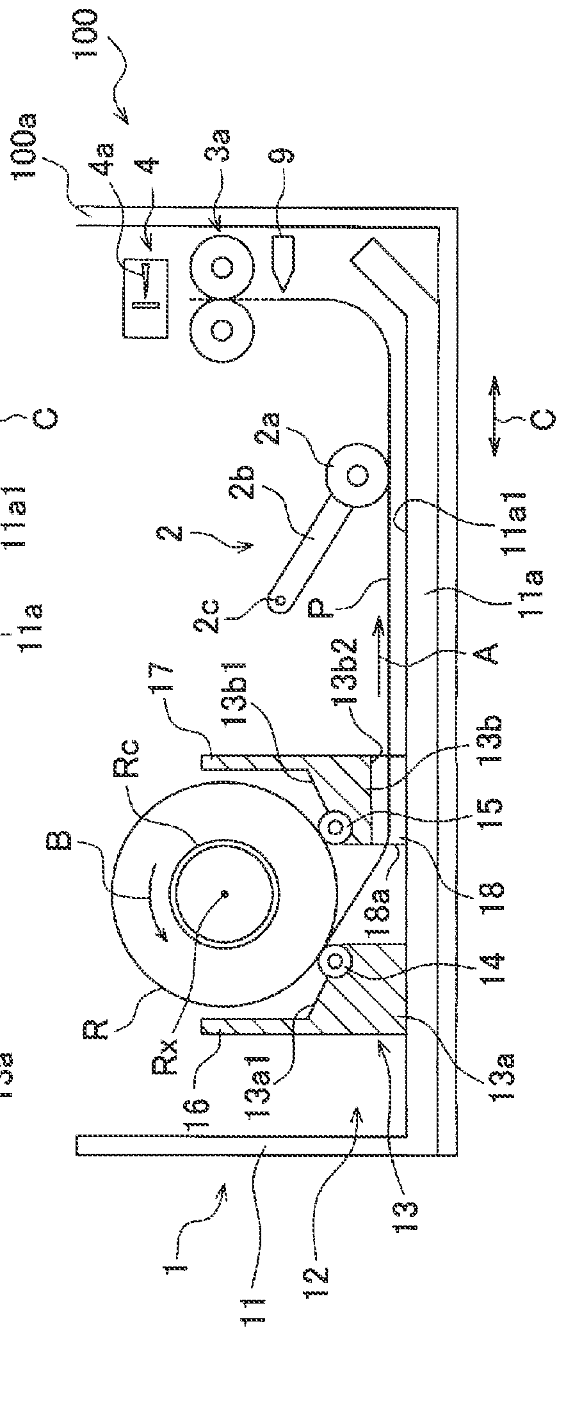
FIG. 5B depicts a situation when conveying a sheet P of the roll sheet accommodated in the sheet feeding cassette.

When accommodating the roll sheet R into the sheet feeding cassette 1, the sheet feeding cassette 2 is first detached from the housing 100*a*. Then, as shown in FIG. 5A, while the tip end of the sheet P unrolled from the roll sheet R is enabled to pass through the passage 18 from the entry 18*a*, the roll sheet R is placed on the two rollers 14 and 15 of the supporter 12. The passage 18 is formed below the support position Ra2 on the most downstream side with respect to the conveying direction A and the sheet P unrolled from the roll sheet R supported on the supporter 12 is enabled to pass through the passage 18, so that the sheet P is difficult to be formed with a curved portion curved in an opposite direction to a curl direction. If a sheet P' from the roll sheet R is unrolled and arranged from above the support position Ra2, as shown with the dashed-two dotted line in FIG. 5A, the sheet P' is formed with a curved portion W curved in an opposite direction to a curl direction. However, in the present embodiment, since the curved portion W is not formed, even though stiffness of the sheet P is relatively high, it is possible to suppress a situation in which an own weight of the roll sheet R becomes lighter as the roll sheet R is used, so that the roll sheet R is floated from the supporter 12.

Then, as shown in FIG. 5A, a user rotates the roll sheet R in the unrolling direction B, thereby arranging the tip end of the sheet P in the vicinity of a tip end of the tray 11. Then, the sheet feeding cassette 1 having the roll sheet R accommodated therein is mounted to the housing 100*a*. Thereafter, when a recording command is received, the controller 7 drives the feeder motor 2M to rotate in the forward direction. Thereby, the sheet P is fed in the conveying direction A by the feeder roller 2*a*. At this time, the two rollers 14 and 15 that support the roll sheet are rotated in conjunction with rotation of the roll sheet R as the feeder roller 2*a* feeds the sheet P. When a signal indicative of detection of the tip end of the sheet P is received from the sensor 9, the controller 7 drives the feeder motor 2M to a position in which the sheet P can be sandwiched by the conveying roller pair 3*a*, and then stops the same, as shown with the broken line in FIG. 5B. Then, the controller 7 drives the first and second conveyor motors 3Ma and 3Mb to rotate in the forward direction, thereby conveying the sheet P by the three sets of the conveying roller pairs 3*a* to 3*c*. When the sheet P passes a position facing the head 5, the controller 7 drives the driver IC 5*a* to eject ink from the nozzles of the head 5. In this way, a desired image is recorded on the sheet P. At this time, the controller 7 also stops the drive of the first and second conveyor motors 3Ma and 3Mb, and then drives the cutting motor 4M to cut the sheet P in a desired position. Thereafter, the controller 7 drives the second conveyor motor 3Mb to convey the cut sheet P. When further recording an image on the sheet P, the controller 7 drives the driver IC 5*a* to eject ink from the nozzles of the head 5. Then, the controller 7 discharges the sheet P having an image formed thereon to the sheet discharge unit 6, and stops the drive of the second conveyor motor 3Mb.

Figure 6A:
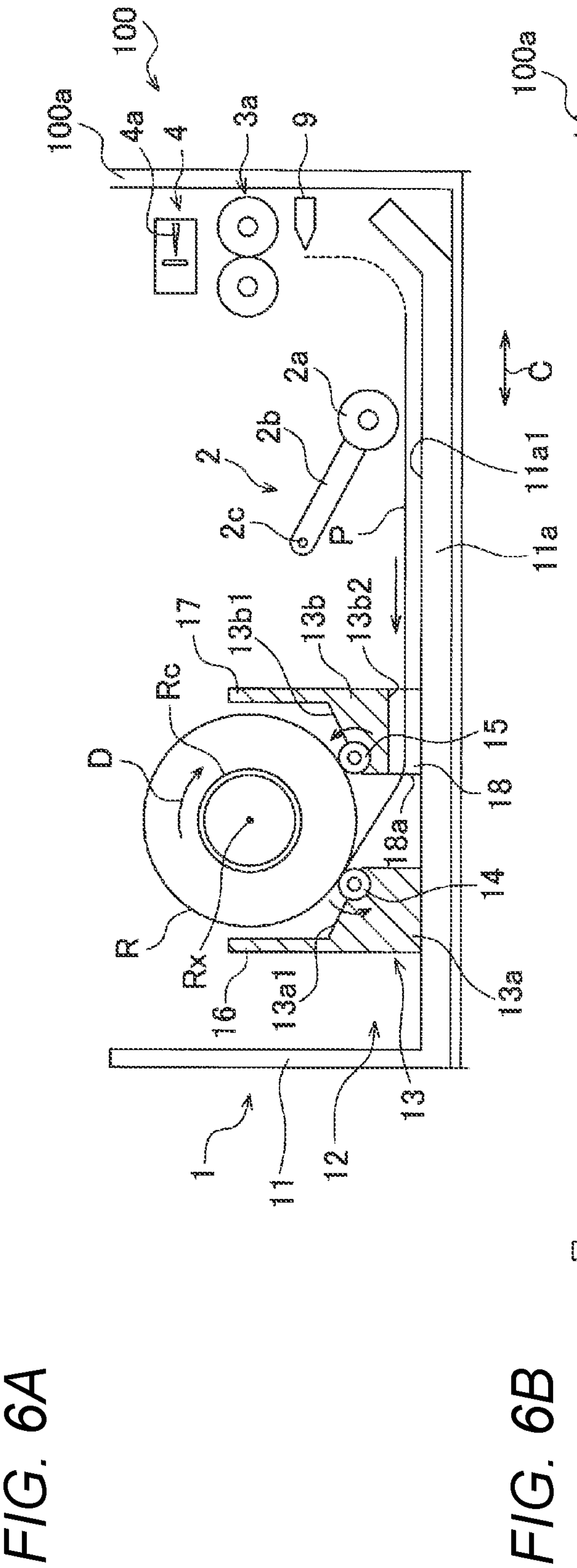
FIG. 6A depicts a situation when return processing of returning a tip end of a sheet cut in a cutting unit is executed.

Then, the controller 7 executes return processing of returning the tip end of the sheet P cut in the cutting unit 4. In the return processing, the controller 7 drives the first conveyor motor 3Ma and the feeder motor 2M to rotate in the reverse direction. Thereby, as shown in FIG. 6A, the sheet P sandwiched by the conveying roller pair 3*a* is sent toward the roll sheet R by the conveying roller pair 3*a*, and the two rollers 14 and 15 rotate in the counterclockwise direction, so that the roll sheet R rotates in an opposite direction (the rolling-up direction D) to the unrolling direction B and the unrolled sheet P is rolled up on the roll sheet R. When a signal detective of detection of the tip end of the sheet P is received from the sensor 9, the controller 7 stops the drive of the first conveyor motor 3Ma, and drives the feeder motor 2M until the tip end of the sheet P is positioned between the feeder roller 2*a* and the conveying roller pair 3*a*, as shown with the broken line in FIG. 6A, and then stops the feeder motor 2M. At this time, the controller 7 controls and stops the drive of the feeder motor 2M so that the tip end of the sheet P is located below the upper end of the tip end of the tray 11 with respect to a moving direction when mounting the sheet feeding cassette 1 to the housing 100*a*.

Figure 6B:
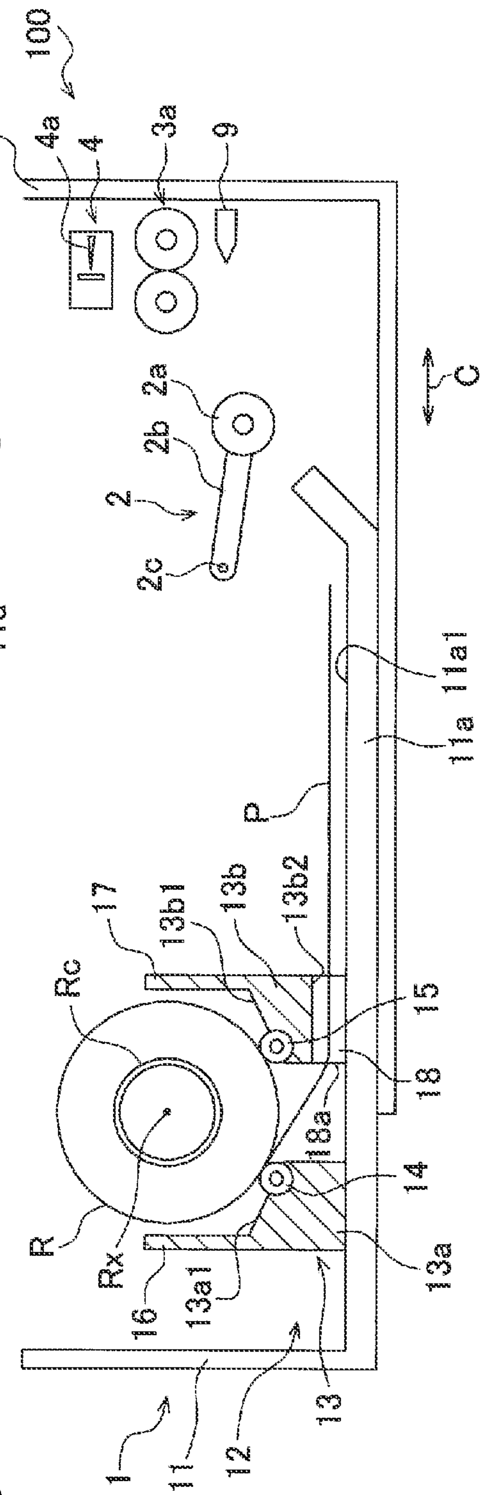
FIG. 6B depicts a situation when the sheet feeding cassette is detached from a housing.

Thereafter, as shown in FIG. 6B, when the user detaches the sheet feeding cassette 1 from the housing 100*a* at a predetermined timing, the arm 2*b* is retreated upward and the sheet feeding cassette 1 is detached from the housing 100*a*. At this time, since the tip end of the sheet P is located below the upper end of the tip end of the tray 11, the tip end of the sheet P is difficult to contact the feeder roller 2*a*, the housing 100*a* and the like. When detaching the sheet feeding cassette 1 from the housing 100*a* to the position shown in FIG. 6B and again mounting the sheet feeding cassette 1, the tip end of the sheet P is difficult to contact the feeder roller 2*a*, the housing 100*a* and the like, so that the tip end of the sheet P is difficult to be bent. Therefore, it is possible to suppress poor feeding of the roll sheet R due to the operations of attaching and detaching the sheet feeding cassette 1 to and from the housing 100*a*.

As described above, according to the sheet feeding cassette 1 of the present embodiment, the supporter 12 supports the roll sheet R in contact with the outer peripheral surface of the lower part (lower half circle area Ra) of the roll sheet R. For this reason, it is not necessary to adjust a position of the roll sheet R, so that it is possible to facilitate a replacement operation of the roll sheet R. The sheet P unrolled from the roll sheet R supported on the supporter 12 is enabled to pass through the passage 18, so that the sheet P is difficult to be formed with the curved portion W curved in the opposite direction to the curl direction. For this reason, as described above, it is possible to suppress the roll sheet R from being floated from the supporter 12.

In the present embodiment, the passage 18 passes below all the support positions Ra2 (in the present embodiment, one support position Ra2) located downstream of the lower end of the roll sheet R with respect to the conveying direction A and extends in the horizontal direction C, and the entry 18*a* is arranged between the two support positions Ra1 and Ra2 in the horizontal direction C. For example, there may also be a plurality of downstream support positions in which the roll sheet R is supported, on a further downstream side than the lower end of the roll sheet R with respect to the conveying direction A. In this case, as compared to a configuration where the entry of the passage is located between the plurality of downstream support positions and the passage is located below the downstream support position located on the most downstream side, according to the present embodiment, the sheet P is more difficult to be formed with the curved portion curved in the opposite direction to the curl direction, so that the roll sheet R is further suppressed from being floated from the supporter 12.

The base part 3*b* of the support base 3 is formed with the groove 13*b*2 and the passage 18 is defined by the groove 13*b*2 and the bottom surface 11*a* of the tray 11. Thereby, the sheet P unrolled from the roll sheet R can be easily enabled to pass through the passage.

The supporter 12 includes the two rollers 14 and 15, so that it is possible to smoothly rotate the roll sheet R.

The sheet feeding cassette 1 includes the transmission mechanism 20 configured to transmit the power from the drive mechanism 8 to the two rollers 14 and 15. Thereby, when the rolling of the sheet P of the roll sheet R is loosened and the outer diameter of the roll sheet R intends to increase, it is possible to suppress the outer diameter of the roll sheet R from increasing because a rotating load by the transmission mechanism 20 is generated for the rollers 14 and 15. If the sheet P is conveyed in a state where the rolling of the roll sheet R is loosened, the rotation of the roll sheet R becomes unstable when conveying the sheet P, and the back tension occurring on the sheet P becomes unstable, so that conveying accuracy of the sheet P is lowered. However, according to the present embodiment, since the rolling of the roll sheet R is difficult to be loosened, it is possible to suppress the conveying accuracy of the sheet P from being lowered.

The transmission mechanism 20 is configured to transmit the power from the drive mechanism 8 to the two rollers 14 and 15. The roller 14 is arranged upstream of the rotation axis Rx of the roll sheet R with respect to the conveying direction A. The roller 15 is arranged downstream of the rotation axis Rx of the roll sheet R with respect to the conveying direction A. According to this configuration, when the transmission mechanism 20 drives the two rollers 14 and 15, even though the roller 14 rotates in the counterclockwise direction so that the roll sheet R can easily float, the roller 15 rotates in the counterclockwise direction so that the roll sheet R is difficult to float, as shown in FIG. 3B. Thereby, it is possible to stably rotate the roll sheet R.

As a modified embodiment, the transmission mechanism 20 may transmit the power from the drive mechanism 8 to any one of the two rollers 14 and 15. Also in this configuration, when the rolling of the sheet P of the roll sheet R is loosened and the outer diameter of the roll sheet R intends to increase, it is possible to suppress the outer diameter of the roll sheet R from increasing because a rotating load by the transmission mechanism 20 is generated for one roller, in a similar manner to the above. At this time, when a direction in which the roll sheet R is rotated by a roller that supports the roll sheet R is only one direction (for example, an unrolling direction of the roll sheet R or an opposite direction to the unrolling direction), the transmission mechanism may transmit the power from the drive mechanism 8 to one roller that can be rotated so as to make it difficult for the roll sheet R to float. In this configuration, it is possible to stably rotate the roll sheet R.

Figure 7:
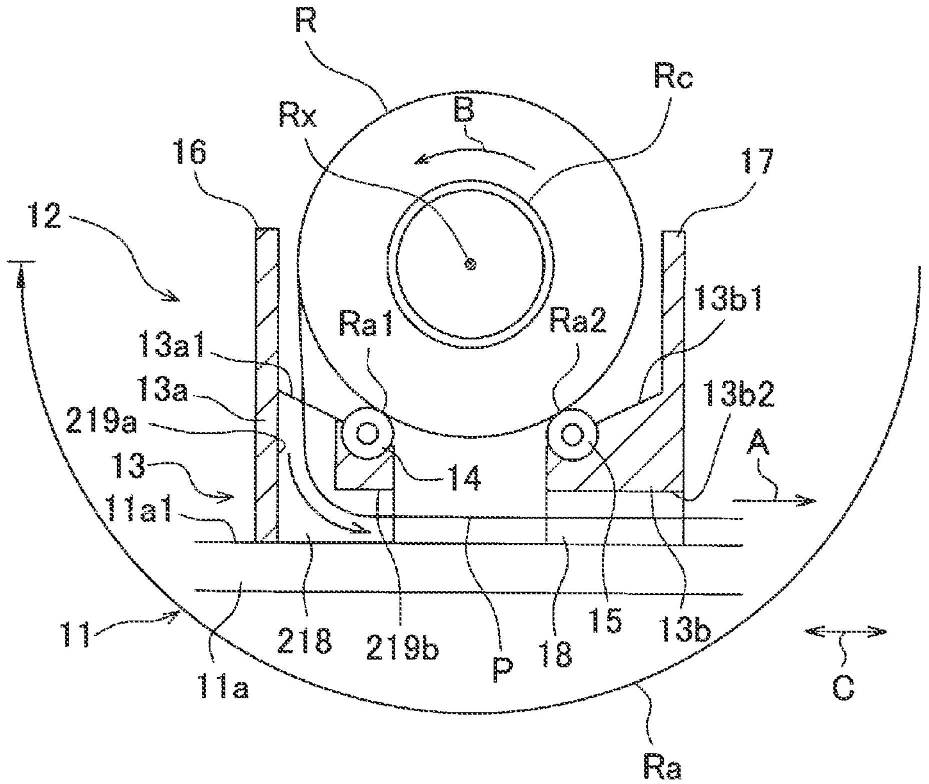
FIG. 7 is a partially enlarged view of a sheet feeding cassette in accordance with a modified embodiment of the present disclosure.

In the above embodiment, only one base part 13*b* of the supporter 12 is formed with the groove 13*b*2 for configuring the passage 18. However, as shown in FIG. 7, the base part 13*a* may also be formed with a hole 219*a* and a groove 219*b* for configuring a passage 218 through which the sheet P is enabled to pass. The similar configurations to the above embodiment are denoted with the same reference signs, and the descriptions thereof are omitted.

In the present modified embodiment, the base part 13*a* of the supporter 12 is formed with the hole 219*a* penetrating in the vertical direction. The hole 219*a* configures a part of the passage 218, and is formed to extend from an upper part toward a vertical lower part of the inclined surface 13*a*1. A lower surface of the base part 13*a* is formed with the groove 219*b* defining a part of the passage 218 for enabling the sheet P to pass therethrough, between the lower surface of the base part 13*a* and the bottom surface 11*a*1 of the tray 11. The groove 219*b* extends in the conveying direction A from a position facing a lower end of the hole 219*a*. The groove 219*b* is linearly arranged with the groove 13*b*2 in the conveying direction A. The hole 219*a* and the groove 219*b* are formed to be longer than the sheet P in the axis direction of the rotation axis Rx of the roll sheet R. The passage 218 configured by the hole 219*a* and the groove 219*b* is formed to have an L-shape in the base part 13*a*. In this modified embodiment, when placing the roll sheet R on the supporter 12, the sheet P unrolled from the roll sheet R is enabled to sequentially pass through the passage 218 and the passage 18. Thereafter, the user rotates the roll sheet R in the unrolling direction B to arrange the tip end of the sheet P in the vicinity of the tip end of the tray 11.

In the modified embodiment, as shown in FIG. 7, the sheet P unrolled from the roll sheet R supported on the supporter 12 is difficult to be formed with a curved portion curved in an opposite direction to a curl direction. For this reason, similarly to the above embodiment, even though the stiffness of the sheet P is relatively high, it is possible to suppress a situation in which an own weight of the roll sheet R becomes lighter as the roll sheet R is used, so that the roll sheet R is floated. In the similar configurations to the above embodiment, the same effects can be achieved.

Although the favorable embodiments of the present disclosure have been described, the present invention is not limited to the embodiments, and a variety of changes can be made within the scope defined in the claims. For example, in the above embodiment, the roll sheet R is supported in the two support positions Ra1 and Ra2 between which the lower end of the roll sheet R is sandwiched. However, the outer peripheral surface of the roll sheet R of the lower part may also be supported from below in three or more support positions between which the lower end of the roll sheet R is sandwiched. In this case, the passage is preferably formed below a support position located on the most upstream side with respect to the conveying direction A. In this configuration, the similar effects to the above embodiment can be achieved.

In the embodiment and each modified embodiment, the roll sheet R is supported from below by the rollers 14 and 15. However, the roll sheet R may also be supported from below by a part other than the rollers (for example, the inclined surfaces 13*a*1 and 13*b*1, the bottom part of the tray 11, and the like), instead of the rollers 14 and 15. When supporting the roll sheet R with the bottom part 11*a* of the tray 11, a passage for enabling the sheet P to pass therethrough is preferably formed below a support position of the bottom part 11*a* (a support position on a further downstream side than the lower end of the roll sheet R with respect to the conveying direction A). In this case, as the passage, if the support position is located above the bottom surface 11*a*1, a space above the bottom surface 11*a*1 may be configured as the passage, or the bottom surface 11*a*1 may be formed with a groove or a concave portion extending in the conveying direction A, as the passage. The friction coefficient of the outer surfaces of the rollers 14 and 15 (the outer surfaces of the cylindrical members 14*b* and 15*b*) may be equal to or smaller than the friction coefficient of the outer surfaces of the shaft members 14*a* and 15*a*.

The transmission mechanism 20 may not be provided. The restraint members 16 and 17 may be provided only one or may not be provided. The roll sheet R may be a coreless roll sheet with no core member Rc. The present invention can be applied to all medium cassettes in which the roll sheet R is accommodated.

What is claimed is:

1. A medium cassette, in which a roll medium having a configuration where a continuous medium is rolled in a roll shape is accommodated, and the continuous medium unrolled from the roll medium is conveyed in a conveying direction, the medium cassette comprising:

a supporter configured to rotatably support the roll medium in contact with an outer peripheral surface of the roll medium in a first support position and a second support position located apart from the first support position in the conveying direction; and a passage through which the continuous medium unrolled from the roll medium passes, wherein the passage is formed below the second support position.

2. The medium cassette according to claim 1, wherein the passage extends in a horizontal direction to pass below the second support position.

3. The medium cassette according to claim 1, wherein an entry of the passage is formed below the first support position.

4. The medium cassette according to claim 1, wherein the passage is formed between the first support position and the second support position.

5. The medium cassette according to claim 1, further comprising a tray that accommodates the roll medium, wherein the supporter includes a support base arranged on a bottom surface of the tray and configured to support the roll medium, and a lower surface of the support base is provided with a groove which extends in the conveying direction and is configured to define the passage between the lower surface of the support base and the bottom surface of the tray.

6. The medium cassette according to claim 1, wherein the supporter includes a plurality of support rollers that rotate around rotation axes parallel to a rotation axis of the roll medium in contact with an outer peripheral surface of a lower part of the roll medium in the first support position and the second support position.

7. The medium cassette according to claim 6, further comprising a transmission mechanism coupled to at least one support roller of the plurality of support rollers to transmit power from a drive source.

8. The medium cassette according to claim 7, wherein the transmission mechanism is coupled to the plurality of support rollers to transmit the power from the drive source.

9. The medium cassette according to claim 6, wherein each of the support rollers includes a shaft member, and a cylindrical member in which the shaft member is inserted, and a surface of the cylindrical member has a higher friction coefficient than a surface of the shaft member.

10. The medium cassette according to claim 1, further comprising a restraint member arranged to be close to an outer peripheral surface of the roll medium having a maximum size which enables to be supported on the supporter, and configured to restrain an outer diameter of the roll medium from increasing as rolling of the continuous medium of the roll medium is loosened.

* * * * *